(12) United States Patent
Yu

(10) Patent No.: US 7,229,231 B2
(45) Date of Patent: Jun. 12, 2007

(54) JOINT

(75) Inventor: Mei-Yun Yu, Taichung Hsien (TW)

(73) Assignee: Steve Huang, Taichung-Hsien (TW)

( * ) Notice: Subject to any disclaimer, the term of this patent is extended or adjusted under 35 U.S.C. 154(b) by 0 days.

(21) Appl. No.: 10/440,170

(22) Filed: May 19, 2003

(65) Prior Publication Data

US 2006/0110216 A1  May 25, 2006

(51) Int. Cl.
- F16D 1/00 (2006.01)
- A47C 7/36 (2006.01)
- A47C 9/00 (2006.01)
- A47B 13/02 (2006.01)
- A47B 3/06 (2006.01)
- F16M 11/00 (2006.01)
- F16M 11/20 (2006.01)

(52) U.S. Cl. .............. 403/340; 297/400; 297/461; 108/150; 108/155; 248/163.1; 248/118.1

(58) Field of Classification Search ........... 403/339, 403/340, 344, 401; 297/461, 440.1, 440.14, 297/440.15, 423.1; 108/150, 155, 157.1; 248/163.1

See application file for complete search history.

(56) References Cited

U.S. PATENT DOCUMENTS

| 1,151,131 | A | * | 8/1915 | Starliper | 403/344 |
| 1,903,631 | A | * | 4/1933 | Morrison | 108/150 |
| 1,930,742 | A | * | 10/1933 | Saussure, Jr. | 108/150 |
| 1,935,682 | A | * | 11/1933 | Wege | 108/150 |
| 1,952,665 | A | * | 3/1934 | Failey | 108/150 |
| 3,055,721 | A | * | 9/1962 | Holt | 108/139 |
| 5,435,425 | A | * | 7/1995 | Ijames | 192/13 R |
| 5,857,800 | A | * | 1/1999 | Nell | 403/344 |
| 6,820,847 | B2 | * | 11/2004 | Camarota et al. | 248/188 |
| 2004/0083934 | A1 | * | 5/2004 | Lin | 108/155 |

* cited by examiner

Primary Examiner—Rehana Perveen
Assistant Examiner—Stefan Stoynov
(74) Attorney, Agent, or Firm—Birch, Stewart, Kolasch & Birch, LLP

(57) ABSTRACT

A joint includes a plurality of plates each including a first portion and a second portion for overlapping the first portion of the next one of the plates. Each of the plates may define a plurality of apertures each for receiving a fastener. Each of the plates may include a tab formed thereon for connection with an article.

20 Claims, 6 Drawing Sheets

JOINT

FIELD OF INVENTION

The present invention relates to a joint.

BACKGROUND OF INVENTION

Taiwanese Patent Publication No. 507844 discloses a joint 1 for use in a table set. Referring to FIG. 6, this table set includes a base 3 and a table 4 mounted on the base 3. The base 3 includes four feet (not numbered) and four legs 32. Each of the feet includes a toe 33 and a high heel 31. The heels 31 are joined with one another by means of the joint 1. Each of the legs 32 includes a lower end connected with one of the heels 31 and an upper end connected with the table 4. Referring to FIG. 4, the joint 1 includes a body 10 consisting of an upper disc 11 and a lower disc 12. The upper disc 11 includes a central hole 112 defined therein and a cruciform recess 111 defined in a lower face of the upper disc 11. The lower disc 12 includes a central hole 122 defined therein and a cruciform recess 121 defined in an upper face of the lower disc 12. A hole 125 is defined in the bottom of each of the prongs of the cruciform recess 121. A cruciform element 13 includes a central hole 132 defined therein, a hole 133 defined in each of the prongs thereof, an upper groove 131 defined in an upper face of two aligned prongs thereof and a lower groove 131 defined in a lower face of the other prongs thereof. In assembly, an upper bar 14 is put in the upper groove 131, and a lower bar 14' in the lower groove 131. The upper disc 11 and the lower disc 12 are combined so that the cruciform recesses 111 and 121 make a cruciform space. Referring to FIG. 5, a bolt 2 is driven into the central holes 112 and 122, a central hole 142 defined in the upper bar 14 and a central hole 142' defined in the lower bar 14'. Each of the toes 31 is inserted in one of the prongs of the cruciform space so as to receive one of the prongs of the cruciform element 13 and one of the ends of the bar 14 or 14'. A bolt is driven into a hole 311 defined in each of the toes 31, one of the holes 141' or 141 of the bar 14' or 14 and the hole 133 defined in each of the prongs of the cruciform element 13. This conventional joint 1 provides however a complicated structure, involves a difficult process of assembly and requires a lot of time to assemble.

The present invention is therefore intended to obviate or at least alleviate the problems encountered in prior art.

SUMMARY OF INVENTION

It is the primary objective of the present invention to provide a joint with a simple structure.

According to the present invention, a joint includes a plurality of plates each including a first portion and a second portion for overlapping the first portion of the next one of the plates.

Each of the plates may define a plurality of apertures each for receiving a fastener.

Each of the plates may include a tab formed thereon with for connection with an article.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus are not limitative of the present invention, and wherein.

DETAILED DESCRIPTION OF EMBODIMENTS

Figure 1:
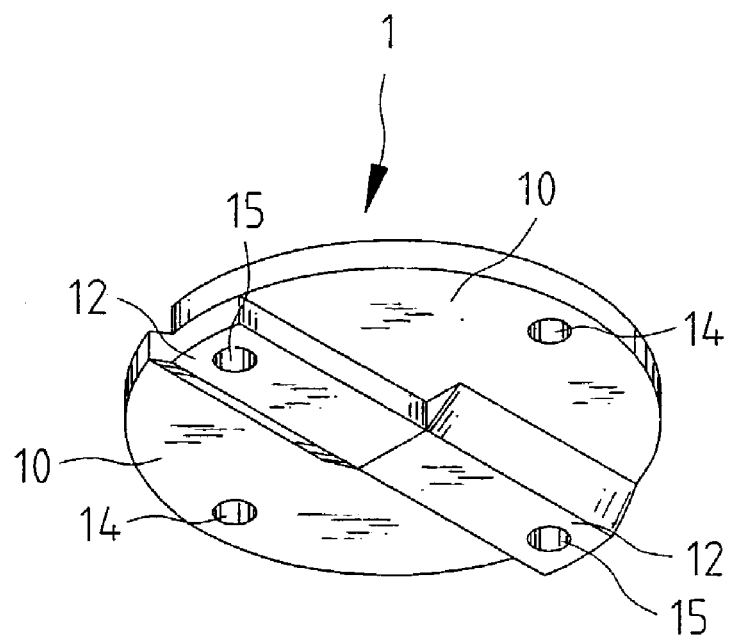
FIG. 1 is a perspective view of a joint according to a first embodiment of the present invention.
Figure 2:
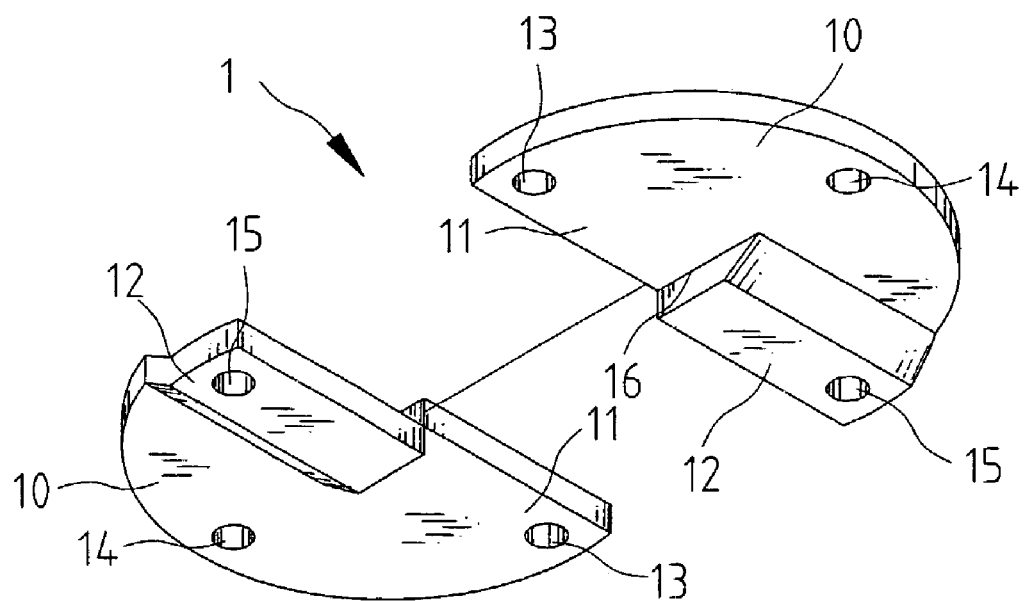
FIG. 2 is an exploded view of the joint shown in FIG. 1.

Referring to FIGS. 1 and 2, according to a first embodiment of the present invention, a joint 1 includes two plates 10. Each of the plates 10 includes a first lip 11 and a second lip 12 not in a same plane with the first lip 11 so that the first lip 11 is separated from the second lip 12 by means of a slit (not numbered). Each of the plates 10 defines an aperture 13 in the first lip 11, an aperture 15 in the second lip 12 and an aperture 14 so that an angle between the apertures 13 and 14 is equal to an angle between the apertures 14 and 15. In use, the first lip 11 of one of the plates 10 overlaps the second lip 12 of the other of the plates 10. The hole 13 of one of the plates 10 aligns with the hole 15 of the other of the plates 10. A fastener (not shown) may be inserted in the hole 13 of one of the plates 10 and the hole 15 of the other of the plates 10 for joining the plates 10.

Figure 3:
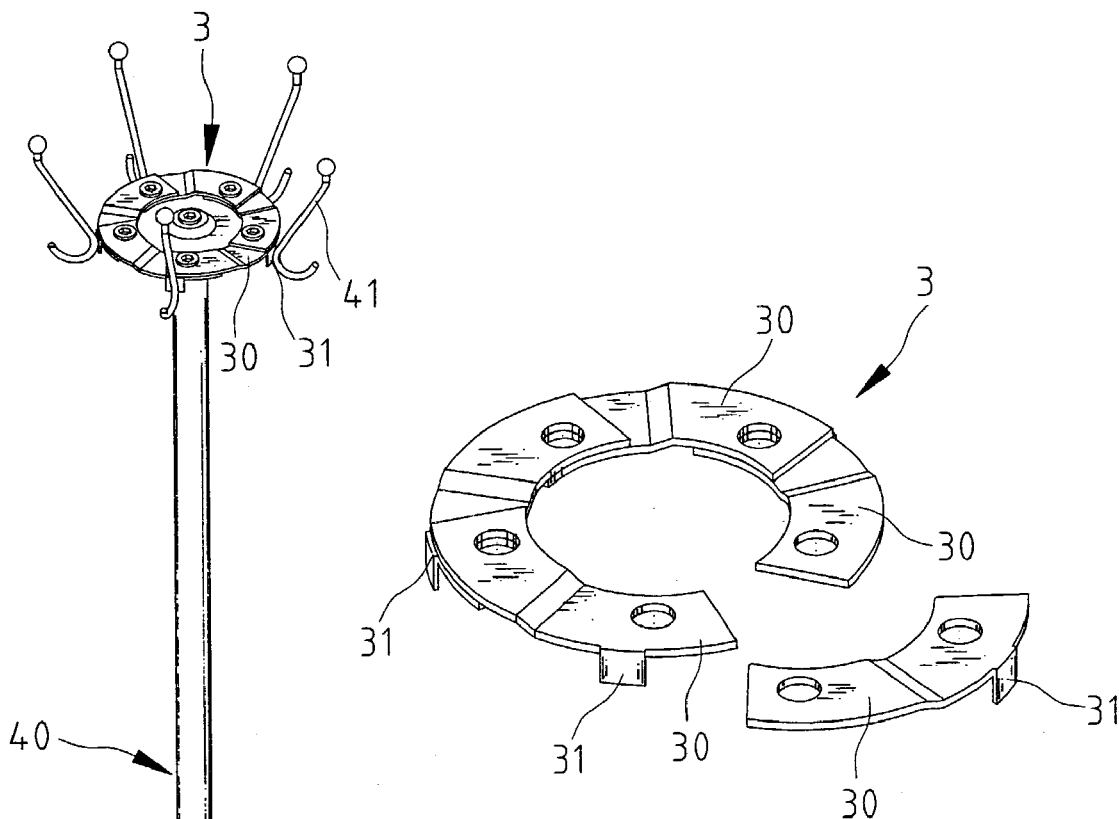
FIG. 3 is a partially exploded view of a joint according to a second embodiment of the present invention.
Figure 4:
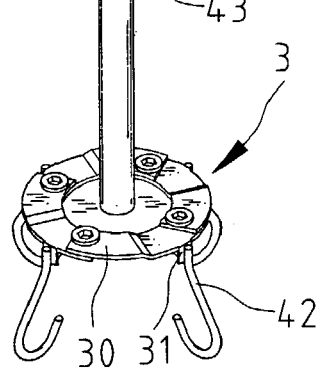
FIG. 4 is a perspective view of a clothes tree using the joint of FIG. 3.

Referring to FIGS. 3 and 4, according to a second embodiment of the present invention, a joint 3 includes a plurality of plates 30. Each of the plates 30 includes a first portion, a second portion not in a same plane with the first portion and a tab 31 formed on the second portion. Each of the plates 30 defines an aperture in the first portion and an aperture in the second portion. In use, the first portion of one of the plates 30 overlaps the second portion of the next one of the plates 30. Thus, the plates 30 make a ring. The hole defined in the first portion of one of the plates 30 aligns with the hole defined in the second portion of the next one of the plates 30. A fastener (not numbered) is inserted in the hole defined in the first portion of one of the plates 30 and the hole defined in the second portion of the next one of the plates 30 for joining the plates 30. FIG. 4 shows a clothes tree 40 including a lower joint 3, an upper joint 3, a plurality of legs 42 secured to the lower joint 3, a stem 43 connected between the lower and upper joints 3, a plurality of hangers 41 secured to the upper joint 3. Each of the legs 42 is secured to the tab 31 of one of the plates 30 of the lower joint 3. Each of the hangers 41 is secured to the tab 31 of one of the plates 30 of the upper joint 3.

Figure 5:
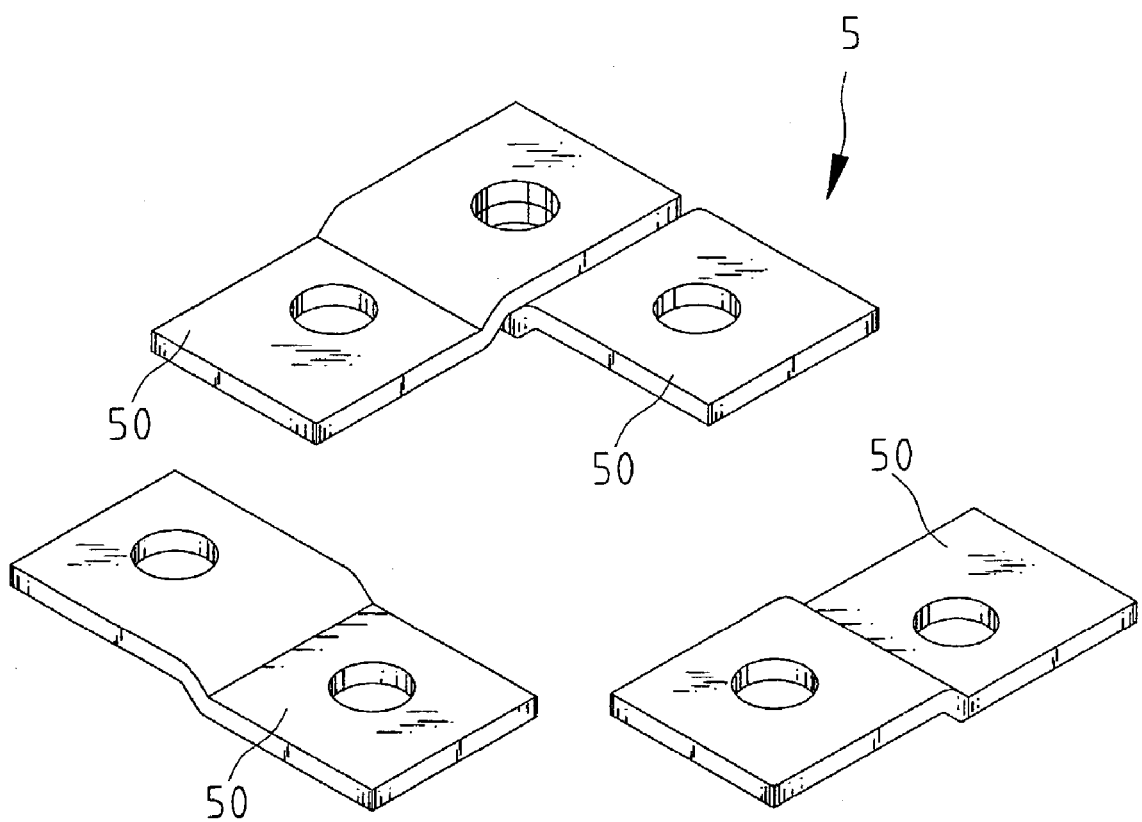
FIG. 5 is a partially exploded view of a joint according to a third embodiment of the present invention.
Figure 6:
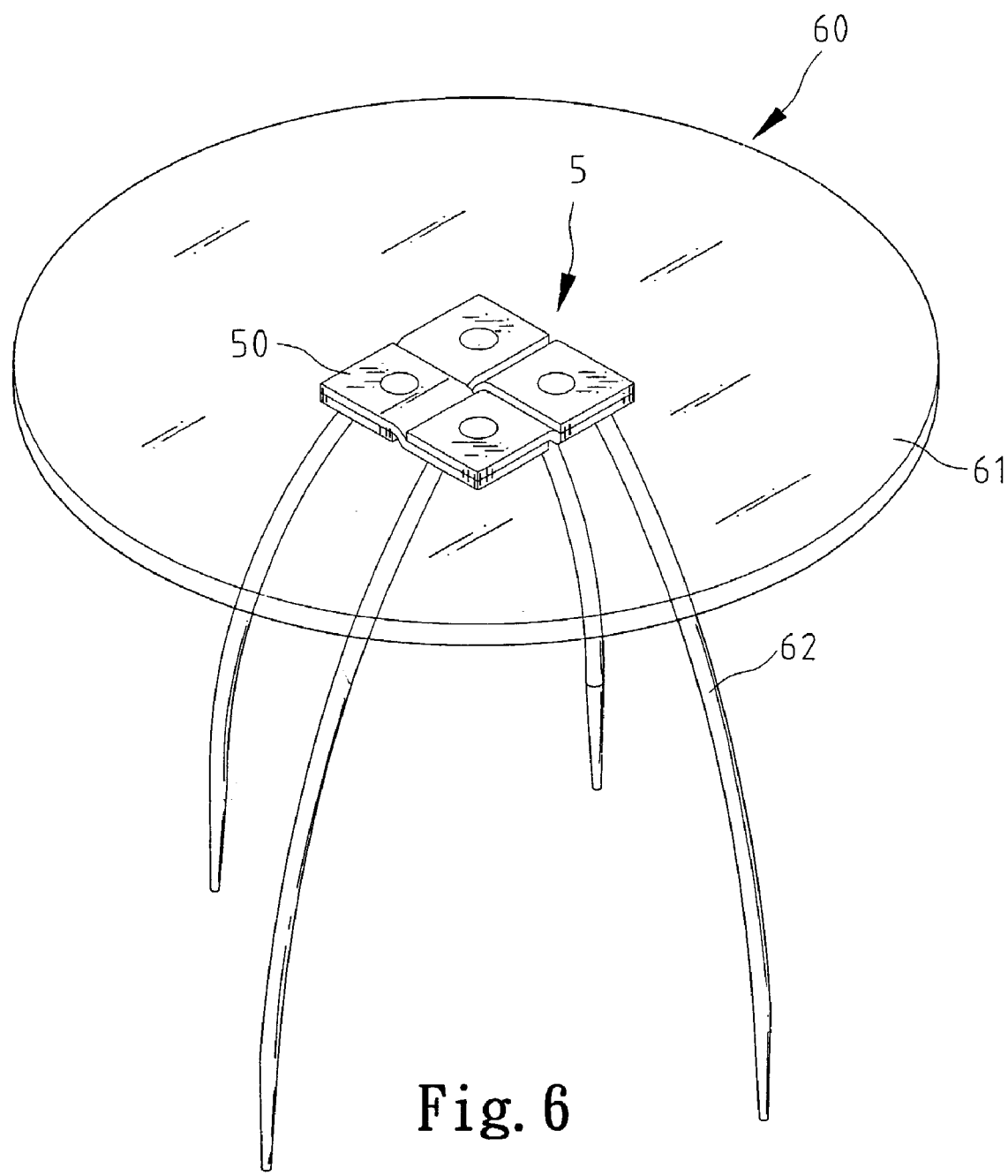
FIG. 6 is a perspective view of a table set using the joint of FIG. 5.

Referring to FIGS. 5 and 6, according to a third embodiment of the present invention, a joint 5 includes a plurality of plates 50. Each of the plates 50 includes a first portion and a second portion not in a same plane with the first portion.

Each of the plates 50 defines an aperture in the first portion and an aperture in the second portion. In use, the first portion of one of the plates 50 overlaps the second portion of the next one of the plates 50. Thus, the plates 50 make a square. The hole defined in the first portion of one of the plates 50 aligns with the hole defined in the second portion of the next one of the plates 50. A fastener (not shown) may be inserted in the hole defined in the first portion of one of the plates 50 and the hole defined in the second portion of the next one of the plates 50 for joining the plates 50. FIG. 6 shows a table set 60 including a joint 5, a plurality of legs 62 secured to the joint 5 and a table 61 mounted on the joint 5. Each of the legs 62 is secured to one of the plates 50.

Figure 7:
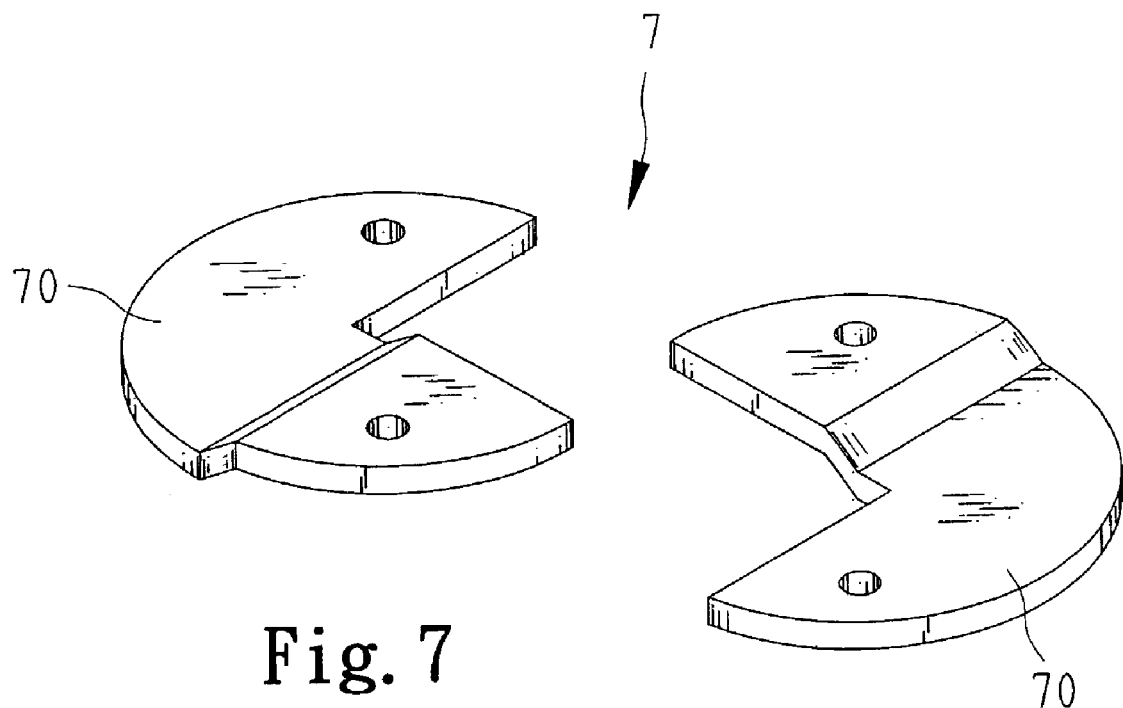
FIG. 7 is an exploded view of a joint according to a fourth embodiment of the present invention.
Figure 8:
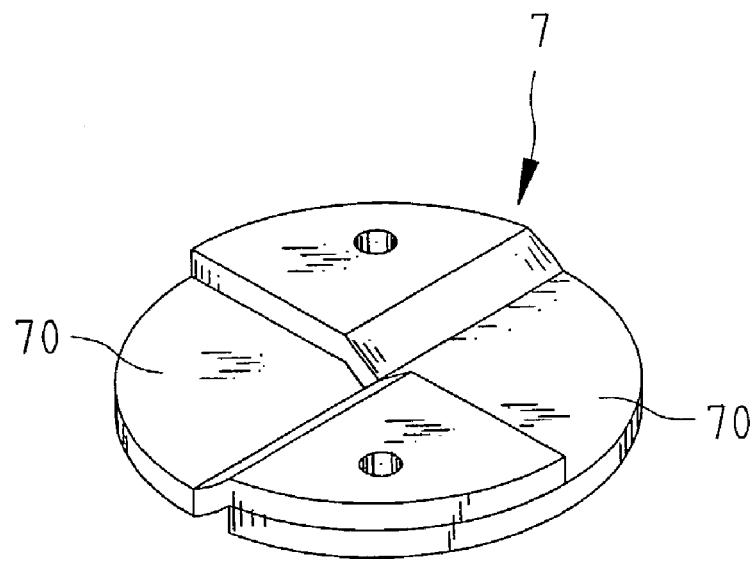
FIG. 8 is a perspective view of the joint of FIG. 7.
Figure 9:
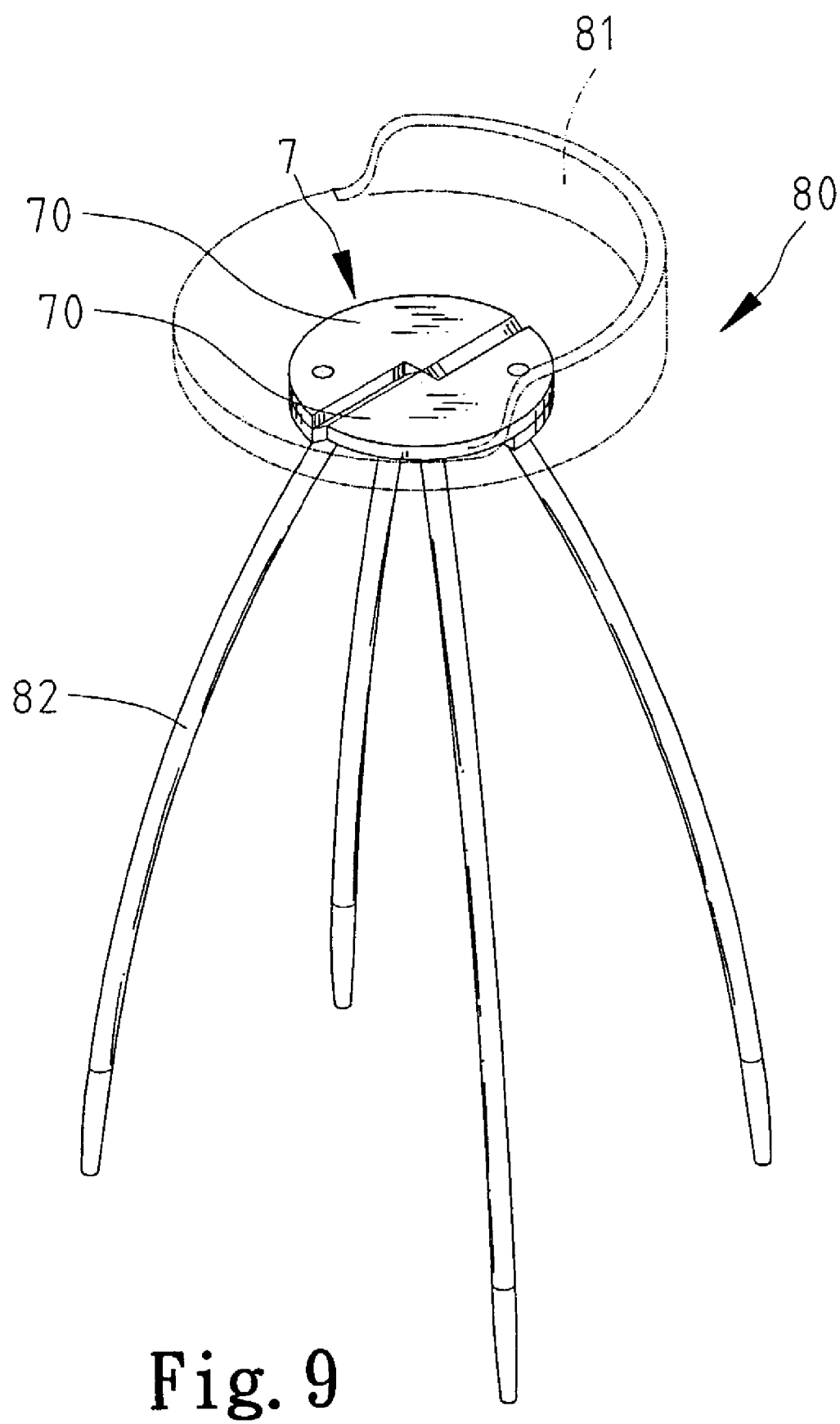
FIG. 9 is a perspective view of a chair using the joint of FIG. 8.

Referring to FIGS. 7~9, according to a fourth embodiment of the present invention, a joint 7 includes two plates 70. Each of the plates 70 includes a first portion and a second portion not in a same plane with the first portion. The first portion makes substantially a half of a circle, and the second portion substantially a quarter of a circle. Each of the plates 70 defines an aperture in the first portion and an aperture in the second portion. In use, the first portion of one of the plates 70 overlaps the second portion of the other of the plates 70. Thus, the plates 70 make a circle. The hole defined in the first portion of one of the plates 70 aligns with the hole defined in the second portion of the other of the plates 70. A fastener (not shown) may be inserted in the hole defined in the first portion of one of the plates 70 and the hole defined in the second portion of the other of the plates 70 for joining the plates 70. FIG. 9 shows a chair 80 including a joint 7, four legs 82 secured to the joint 7 and a seat 81 mounted on the joint 7. Two of the legs 62 are secured to each of the plates 70.

The present invention has been described via detailed illustration of some embodiments. Those skilled in the art can derive variations from the embodiments without departing from the scope of the present invention. Therefore, the embodiments shall not limit the scope of the present invention defined in the claims.

What is claimed is:

1. A table joint including a plurality of plates each including a first portion and a second portion for overlapping the first portion of the next one of the plates so that a panel of the table can be installed on an upper side of the joint while at least one leg of the table can be attached to a lower side of the joint, the first portion of one plate being parallel and non-coincident with the second portion of the next one of the plates when the panel is installed on the upper side of the joint, the first portion of one plate having an aperture therein which aligns with an aperture in the second portion of the next one of the plates when the panel is installed on the upper side of the joint, an axis passing through the aligned apertures and being perpendicular to the plates intersecting the panel.

2. The table joint according to claim 1 wherein each of the plates has at least one of the apertures for receiving a fastener.

3. The table joint according to claim 1 wherein each of the plates is formed with a tab for connection with an article.

4. The table joint according to claim 1 wherein the joint consists of two plates.

5. The table joint according to claim 4 wherein each of the plates defines a slit separating the first portion from the second portion.

6. The table joint according to claim 4 wherein the first portion makes substantially a half of a circle, and the second portion substantially a quarter of a circle.

7. The table joint according to claim 1 wherein each of the plates is a rectangular one.

8. The table joint according to claim 1 wherein each of the plates makes a sector.

9. The table joint according to claim 8 wherein the joint makes a ring.

10. The table joint according to claim 8 wherein the joint makes a circle.

11. A chair joint including a plurality of plates each including a first portion and a second portion for overlapping the first portion of the next one of the plates, wherein a seat of the chair can be installed on an upper side of the joint while at least one leg of the chair can be attached to a lower side of the joint, the first portion of one plate being parallel and non-coincident with the second portion of the next one of the plates when the seat is installed on the upper side of the joint, the first portion of one plate having an aperture therein which aligns with an aperture in the second portion of the next one of the plates when the seat is installed on the upper side of the joint, an axis passing through the aligned apertures and being perpendicular to the plates intersecting the seat.

12. The chair joint according to claim 11 wherein each of the plates has at least one of the apertures for receiving a fastener.

13. The chair joint according to claim 11 wherein each of the plates is formed with a tab for connection with an article.

14. The chair joint according to claim 11 wherein the joint consists of two plates.

15. The chair joint according to claim 14 wherein each of the plates defines a slit separating the first portion from the second portion.

16. The chair joint according to claim 14 wherein the first portion makes substantially a half of a circle, and the second portion substantially a quarter of a circle.

17. The chair joint according to claim 11 wherein each of the plates is a rectangular one.

18. The chair joint according to claim 11 wherein each of the plates makes a sector.

19. The chair joint according to claim 18 wherein the joint makes a ring.

20. The chair joint according to claim 18 wherein the joint makes a circle.

* * * * *